US008719614B2

(12) United States Patent
Yensen et al.

(10) Patent No.: US 8,719,614 B2
(45) Date of Patent: May 6, 2014

(54) APPARATUS AND METHOD FOR GENERATING A TIMING SIGNAL

(75) Inventors: Trevor Noel Yensen, Ottawa (CA); Ryan Shawn Halpin, Ottawa (CA); Jeffrey Lariviere, Mountain (CA)

(73) Assignee: Allen-Vanguard Corporation, Ottawa (CA)

( * ) Notice: Subject to any disclaimer, the term of this patent is extended or adjusted under 35 U.S.C. 154(b) by 422 days.

(21) Appl. No.: 13/131,504

(22) PCT Filed: Mar. 9, 2010

(86) PCT No.: PCT/CA2010/000309
§ 371 (c)(1), (2), (4) Date: May 26, 2011

(87) PCT Pub. No.: WO2010/102382
PCT Pub. Date: Sep. 16, 2010

(65) Prior Publication Data

US 2011/0309864 A1 Dec. 22, 2011

Related U.S. Application Data

(60) Provisional application No. 61/158,914, filed on Mar. 10, 2009.

(51) Int. Cl.
*G06F 1/00* (2006.01)
*G06F 1/04* (2006.01)

(52) U.S. Cl.
USPC .......................................... 713/500; 713/503

(58) Field of Classification Search
None
See application file for complete search history.

(56) References Cited

U.S. PATENT DOCUMENTS

| | | | | | |
|---|---|---|---|---|---|
| 5,629,649 | A * | 5/1997 | Ujiie | ............................... | 331/17 |
| 5,867,544 | A * | 2/1999 | Taniguchi | ...................... | 375/376 |
| 6,633,621 | B1 * | 10/2003 | Bishop et al. | ................. | 375/376 |
| 2003/0164795 | A1 * | 9/2003 | McBurney | ............... | 342/357.06 |
| 2004/0170200 | A1 * | 9/2004 | Radjassamy | .................. | 370/518 |

FOREIGN PATENT DOCUMENTS

| | | |
|---|---|---|
| EP | 0768583 | 4/1997 |
| JP | 2002016438 | 1/2002 |
| WO | 2004088914 | 10/2004 |

* cited by examiner

*Primary Examiner* — Mohammed Rehman
*Assistant Examiner* — Vincent Chang
(74) *Attorney, Agent, or Firm* — McMillan LLP

(57) ABSTRACT

An apparatus is provided for generating a timing signal having an input for receiving a first signal indicating successive time intervals, means for receiving a second signal indicating successive time intervals, and a generator adapted to generate a timing signal based on the second signal and on a relationship between one or more time intervals of the first signal and one or more time intervals of the second signal. This arrangement enables a timing signal to be generated using a time signal produced by a source or device and to be based on a time signal produced by another source or device.

26 Claims, 7 Drawing Sheets

APPARATUS AND METHOD FOR GENERATING A TIMING SIGNAL

FIELD OF THE INVENTION

The present invention relates to apparatus and methods for generating timing signals, and in particular, but not limited to apparatus and methods for generating timing signals for controlling the operation of electronic equipment and devices.

BACKGROUND ART

It is well known that local clock sources are employed in electronic devices and equipment to generate timing signals to control the timing and synchronization of components and signaling.

Other clock sources include the globally accepted universal time period. The universal time reference is available from sources such as the global positioning satellite (GPS) network. A GPS receiver produces a one pulse per second (1PPS) signal from the universal time reference signals broadcast by GPS satellites with which it communicates. Once the GPS receiver establishes communication with the GPS satellites, the receiver computes the universal time from the time reference signals, and generates a 1PPS signal synchronized to it.

SUMMARY OF THE INVENTION

According to one aspect of the present invention, there is provided an apparatus for generating a timing signal, comprising means for receiving a first signal indicating successive time intervals; means for receiving a second signal indicating successive time intervals; and a generator adapted to generate a timing signal based on the second signal and on a relationship between one or more time intervals of said first signal and one or more time intervals of said second signal.

This arrangement enables a timing signal to be generated using a time signal (second signal) produced by a source or device, and to be based on a time signal (first signal) produced by another source or device. By knowing the relationship between the time signals, the timing signal may be generated to track one or more aspects of the first signal. For example, the timing signal may be generated to track the period of the first signal, and/or the start of a time interval or period indicated by the timing signal may be synchronized to the start of a time interval or period of the first signal. The first signal may be a time reference signal, having an accurate periodicity provided by an accurate time reference source. The second signal may be provided by a local clock source or oscillator, having an arbitrary period. Using the relationship between the periodicity of the two signals, and the local source time signal, the apparatus allows a timing signal to be generated with an accuracy which approaches that of the reference source. The generated timing signal may be a replicate of the reference signal or any desired timing sequence. Advantageously, the apparatus enables the timing signal to be generated if the first signal is lost.

In some embodiments, the relationship may be determined and updated periodically, and the updated relationship used to generate the timing signal. Thus, rather than using a single or once-only determined relationship to generate the timing signal, the relationship may be periodically reevaluated, to take account of changes or fluctuations in the periodicity of the second signal and/or the first signal, due, for example, to temperature changes and/or other factors. Advantageously, this enables the generated timing signal to track the first time signal more accurately over time.

In some embodiments, the apparatus further comprises determining means for determining the relationship from said first and second signals. In other embodiments, the relationship may be determined by a device external of the apparatus, and then provided to the apparatus.

In some embodiments, the relationship is one or both of (1) the number of successive time intervals of the second signal in one or more time intervals of the first signal and (2) the number of successive time intervals of the first signal in one or more successive time intervals of the second signal. In either case, a time interval of the first signal may be longer or shorter than that of the second signal. It is envisaged that if the successive time intervals of the second signal are shorter than successive time intervals of the first signal (or vice versa), the relationship may be expressed as either (1) or (2) above, one simply being the reciprocal of the other. In other words, if there are 10 time intervals of the second signal in 1 time interval of the first signal, this may also be expressed as 1/10 of a time interval of the first signal in 1 time interval of the second signal.

In some embodiments, the generator means is adapted to generate the timing signal using either one or both numbers (1), (2), defined in the preceding paragraph.

In some embodiments, the generating means is adapted to generate the timing signal based on the time intervals in the second signal.

In some embodiments, the determining means is adapted to determine the number of time intervals of the second signal in each of a plurality of time intervals of the first signal.

In some embodiments, the determining means is adapted to determine the average (or mean) number of time intervals of the second signal in a time interval of the first signal or vice versa.

In some embodiments, the generator means is adapted to generate the timing signal based on the average (or mean) number of time intervals of the second signal in a time interval of the first signal, or vice versa.

In some embodiments, the determining means is adapted to determine the mean using the equation:

$$\tilde{x}_i = \frac{1}{N}\sum_{k=0}^{N-1} x_{i-k}, \tag{1}$$

where N is the number of samples and $x_{i-k}$ is the number of time intervals of the second signal in the i-kth sample of the time interval of the first signal.

In some embodiments, the determining means is adapted to determine a value indicative of a deviation (e.g. standard deviation) of said number from said average number.

In some embodiments, the determining means is adapted to determine the deviation using the equation:

$$\tilde{\delta}_i = \frac{1}{N}\sum_{k=0}^{N-1} |\tilde{x}_i - x_{i-k}|, \tag{2}$$

where N is the number of samples and $x_i$ is the number of time intervals of the second signal in the ith sample of the time interval of the first signal. $\tilde{x}_i$ is the average number of time intervals of the second signal in the first signal across the last N iterations.

In some embodiments, the determining means is adapted to determine a first average from a first plurality of samples, each sample comprising the number of time intervals of the second signal in a time interval of the first signal, to determine a first difference between the first average and one of said samples, to determine a second average from a second plurality of samples, at least one sample of said second plurality of samples not included in the first plurality of samples, to determine a second difference between said second average and a sample of said second plurality of samples, and to determine a deviation based on the first and second differences. Advantageously, this method reduces the number of calculations required to determine the deviation by using a value of the difference between the average number and a measured number already determined in a previous calculation, for example, of a deviation. A specific example is provided below by Equation (3).

In some embodiments, the determining means is adapted to determine said deviation by determining the modulus of said first and second differences and determining the sum of the modulus of each difference.

In some embodiments, the determining means is adapted to determine the deviation using the less computationally expensive equation:

$$\tilde{\delta}_i = \frac{1}{N}\sum_{k=0}^{N-1}|\tilde{x}_{i-k} - x_{i-k}|, \tag{3}$$

where N is the number of samples and $x_i$ is the number of time intervals of the second signal in the ith sample of the time interval of the first signal. As mentioned above, this calculation uses previously calculated values of the difference between the average and sampled or measured values of x, thereby reducing the number of calculations required for the deviation in comparison to Equation (2).

In some embodiments, the apparatus further comprises control means for determining whether or not the value of the deviation meets a predetermined criteria and which is operative to control the generator means based on the determination.

In some embodiments, the controller is adapted only to pass a value of the number (e.g. average number) of time intervals of the second signal in a time interval of the first signal (or vice versa) to the generator means, or enable said generator means to use said value, if the deviation meets the predetermined criteria.

In some embodiments, the predetermined criteria is that the deviation is either less than or equal to a predetermined threshold value or less than a predetermined threshold value.

In some embodiments, the determining means is adapted to repeatedly determine the average number of time intervals of said second signal in a time interval of said first signal (or vice versa) and a value indicative of the deviation from the mean for each average number and the controller is adapted to select which of the determined average numbers to provide to the generator means to generate the timing signal based on the value of each determined deviation.

In some embodiments, the controller is adapted to provide the generator means with successively determined values of the average number if each deviation associated with a respective average number is either at or below a predetermined threshold.

In some embodiments, the controller is adapted to determine the difference between the average number of time intervals of the second signal in a time interval of the first signal (or vice versa) and a measured value of the number of time intervals of the second signal in a time interval of the first signal (or vice versa) at a particular instance, and to compare the determined difference with a threshold value.

In some embodiments, the average value is the best known estimator of the mean.

In some embodiments, the controller is adapted to provide the best known estimator of the mean to the generator means if the difference is either less than or equal to a predetermined value.

In some embodiments, the apparatus further comprises a controller for controlling one or more of (1) which time intervals of said first signal are used in the determination of the relationship between the time intervals of the first and second signals and (2) the number of time intervals of the first signal used in the determination of the relationship.

In some embodiments, the controller is adapted to change which time intervals of said first signal are used in the determination of the relationship between the time intervals of the first and second signals with the progression of time.

In some embodiments, the controller is adapted to vary with time the selection of which time intervals are used in said determination, and the determining means is adapted to determine the number of time intervals of the second signal in each of the plurality of time intervals of the first signal (or vice versa) for each said selection. This embodiment may be adapted to implement a “sliding window” sampling scheme. For example, the present sample and each of a certain number of previous samples may be used to determine a present average of the number, and at the next sample, the next sample and a certain number of previous samples may be used to determine the next average of the number, and so on.

In some embodiments, the controller is adapted to provide the generator means with one or more previously determined value(s) of the number of time intervals of the second signal in each of a plurality of time intervals of the first signal (or vice versa) if one or more predetermined criteria is met.

In some embodiments, the predetermined criteria is based on a quality or absence of said first signal. For example, if the first signal is lost or disappears, one or more previously determined value(s) of the number of time intervals of the second signal in a time interval of the first signal (or vice versa) or a number based thereon may be provided to the generator means by the controller, rather than a present value determined during loss of the first signal. This allows the generator to continue to generate the timing signal based on a previously determined valid number, which may, for example be the most recently determined valid number, e.g. best estimator of the mean, and thereby maintain synchronism with the first signal, even though lost.

In some embodiments, the predetermined criteria includes the quality of said first signal falling below a predetermined value.

In some embodiments, the number of time intervals of the second signal in a time interval of the first signal depends on the temperature of a source providing the second signal, and the controller is adapted to provide the generator means with a number appropriate to the temperature of said source. Advantageously, this arrangement allows the number to be compensated for temperature.

In some embodiments, the controller is adapted to control the number provided to said generator means in response to the temperature of the source of the second signal.

In some embodiments, the apparatus further comprises one or more of a conversion system and a lookup table containing a plurality of temperature dependent values of said number to enable the controller to control the number provided to the generator means in response to the temperature of the source of said second signal.

In some embodiments, the apparatus further comprises synchronizing means for synchronizing the start of a time interval in the generated timing signal with a start of a time interval in said first signal. The synchronizing means may include detection means for detecting a feature of the first signal, for example a transition in the signal, such as a pulse edge, for instance.

In some embodiments, the apparatus further comprises aligning means for aligning the start of a time interval in the timing signal with a start of a time interval in the first signal. In some embodiments, the aligning means may comprise means for advancing the start of the timing signal to compensate for delay between detection of the start of a time interval of the first signal and generating a start of the timing signal.

In some embodiments, the apparatus may further comprise detection means for detecting a start or end of a time interval of the first signal, and control means adapted to provide an indication of a detected start or end of the time interval to the generator or the generator is responsive to the indication only if the number of measured time intervals of the second signal prior to the detection meets a predetermined criteria. For example, the predetermined criteria may be that a difference between a predetermined value of the number of time intervals of the second signal in a time interval of the first signal and the measured value is less than or equal to the predetermined value.

In some embodiments, the apparatus further comprises determining means for determining a start or end of a time interval in the first signal. The determining means may comprise detection means for detecting the start or end. The determining means may further comprise checking means for checking if a detected start or end of a time interval in the first signal is valid. The checking means may be adapted to check if the measured number of time intervals of the second signal in the time interval of the first signal as defined by the detection of a start or end meets a predetermined criteria. In some embodiments, the predetermined criteria is whether the difference between the measured number and a predetermined number is below or equal to a threshold value.

In some embodiments, the generator is responsive to a determination of the start or end of a time interval in the first signal to generate a start of the timing signal.

In some embodiments, the generator is adapted to generate a start of the timing signal in response to the determination of the start or end being verified by the checking means as valid.

In some embodiments, the generator generates, in the absence of a determination of an expected start or end of a time interval of the first signal, the start of the next timing signal based on the relationship and the second signal.

In some embodiments, the generator is adapted to continue to generate the start of successive timing signals based on the relationship in the continued absence of the determination of the start or end of a time interval of the first signal.

In some embodiments, the generator is adapted to resume generation of a start of the timing signal based on a determination of a start or end of a time interval of the first signal, in response to a determination of a start or end of a time interval of the first signal when one or more start or end of a time interval of the first signal has been determined.

In some embodiments, the generator comprises a sequence generator for generating the timing signal based on a predefined sequence of values.

In some embodiments, the apparatus further comprises a sequence generator operatively coupled to the timing generator for generating a time varying signal based on a predefined sequence of values, wherein the sequence has a timing relationship with the timing signal generated by the timing generator.

In some embodiments, the predefined sequence comprises a predefined number of sequential segments, each having an associated value, the segments including a first segment representing the start of the sequence and a last segment representing the end of the sequence.

In some embodiments, the sequence generator includes a sequence generating controller for varying the total number of sequence segments used to generate a generated sequence. The sequence generating controller may be adapted to vary the number by at least one of (1) excluding one or more of the predefined sequence segments from the generated sequence, and (2) inserting one or more segments into the generated sequence, whether the one or more segments is part of the predefined sequence or not. In some embodiments, the sequence generating controller is adapted to vary the number by inserting one or more segments into the generated sequence by repeating the generation of one or more segments of the predefined sequence.

In some embodiments, the sequence generating controller is adapted to vary the number based on the relationship between the number of time intervals in the first and second signals.

In some embodiments, the sequence generating controller is adapted to vary the number based on a difference between the predefined number of sequence segments in the predefined sequence and the number of time intervals of the second signal in one or more time intervals of the first signal.

In some embodiments, the number of time intervals of the second signal in one or more time intervals of the first signal is one of (1) a measured number for a particular time interval of the first signal and a determined average of a plurality of measured numbers. In some embodiments, the sequence generating controller is adapted to control the number of sequence segments in a generated sequence to substantially correspond to the measured number or the determined average number of time intervals of the second signal in a time interval of the first signal.

In some embodiments, the sequence generating controller is adapted to distribute exclusions of segments of the predefined sequence or insertions of additional segments so that two or more exclusions of segments or two or more additional segments are not excluded or added as consecutive segments in the generated sequence. In some embodiments, the sequence generating controller is adapted to distribute exclusions of segments or additional segments substantially uniformly in the generated sequence.

In some embodiments, the sequence generator is adapted to output one segment of the sequence in each time interval of the second signal.

In some embodiments, the sequence generator is adapted to generate simultaneously a plurality of sequences. The sequence generator may be adapted to output one segment of each sequence substantially simultaneously. The sequence generator may be adapted to output a respective segment of each sequence in each time interval of the second signal.

In some embodiments, the sequence generating controller may be adapted to modify the number of segments of the predefined sequence in the generated sequence so that the generated sequence spans a time period corresponding to one or more time intervals defined by the first signal.

In some embodiments, the sequence generator is adapted to synchronize an aspect of the sequence with the timing signal from the generator.

In some embodiments, the sequence generator is adapted to synchronize the start of the sequence at a time, e.g. a pulse edge, indicated by the timing signal, e.g. the reference timing signal.

In some embodiments, the apparatus further comprises a device operatively coupled to the sequence generator for receiving the sequence and whose operation is controlled by the sequence.

As mentioned above, in some embodiments, the second signal is generated by a local oscillator.

In some embodiments, the apparatus further comprises the local oscillator.

In some embodiments, the first signal is generated by a source providing a reference time signal.

In some embodiments, the apparatus further comprises a wireless receiver for wirelessly receiving the reference time signal.

In some embodiments, the receiver is adapted to generate the first signal based on the reference signal.

In some embodiments, the receiver comprises a receiver for a global positioning system (GPS), or for a global navigation system.

Embodiments of the apparatus and method may use statistics to estimate parameters indicative of the difference between a time period generated by a local system oscillator and the true period of a 1PPS reference source or a source with a time period other than 1 second, for example 0.5 seconds or 0.1 seconds. The relationship between the local clock oscillator period, $T_{CLK}$, and the period of the universal one pulse per second, 1PPS, reference source, $T_{UT}$, can be represented by:

$$T_{UT}=x_iT_{CLK}+\epsilon_i$$

where $\epsilon_i$ represents the error in estimating the true 1PPS period reference, $T_{UT}$, at instance i using $x_i$ iterations of the local clock period, $T_{CLK}$. The error, $\epsilon_i$, stems, for example, from the error between the universal time period and a source, e.g. GPS receiver generating a 1PPS signal from the universal time period, the latter tending to fluctuate about a mean value. The fluctuations may appear as a saw tooth in a plot of the 1PPS period versus the universal time period. The error may also include errors produced by transient behaviour, for example erratic 1PPS signal output during GPS receiver start-up and/or by the apparatus, due to temperature fluctuations and/or other factors affecting the nominal period of the local oscillator.

In some embodiments, the number of iterations of the local clock period at any instance i required to generate a period of the reference signal is denoted $x_i$. After averaging, the number of iterations of the local clock period at any instance i required to generate a period of the reference signal is denoted $\tilde{x}_i$ and after averaging and filtering, the number of iterations of the local clock period at any instance required to generate a period of the reference signal is denoted $\bar{x}_i$.

In some embodiments, the timing generator may be adapted to generate a timing signal whose period is $\bar{x}_iT_{CLK}$. In other embodiments any other form of conditioning or processing may be used to determine a value of x for generating the timing signal.

The number of periods of the local clock oscillator, $\bar{x}_i$, required to generate a true one second interval, or different time interval, may vary over time due to temperature fluctuations and other phenomena that affect the local oscillator. To account for such variations, embodiments of the apparatus and method are adapted to periodically or continuously update the value of $\bar{x}_i$. Where the method is implemented by an algorithm, this may be achieved by running the tracking portion of the algorithm continuously to maintain the accuracy of the local 1PPS. The tracking portion of the algorithm is not run, however, to update the value of $\bar{x}_i$ when the universal 1PPS reference signal (or other time signal) is lost, for example, when the GPS receiver loses satellite lock.

In some embodiments, the internally generated timing signal, e.g. 1PPS sequence, $x_iT_{CLK}$, not only needs to have a matching period to the true 1PPS signal, but it may also need to align start of the generated 1PPS period with the instance at which the 1PPS period starts. In some embodiments, the internal 1PPS sequence is forced to align itself with the edge of the 1PPS reference from a device such as a GPS receiver, by lining up the starting edges. If the GPS 1PPS reference is lost then the alignment is maintained through the accurate local generation of the 1PPS signal, $\bar{x}_iT_{CLK}$, using the determined $\bar{x}_i$ parameter. There may be an implicit small delay between the start of the generated synchronization sequence and the starting sample of the output sequence, due to the implementation, for example, gate delay.

In some embodiments, the apparatus and method are adapted to compute an estimator of the average number of local oscillator clock cycles required to achieve a universal one second period and may be adapted also to determine the standard deviation of this 1PPS estimator. The average and standard deviation can be computed using standard statistical techniques across the entire sample space. However, for some implementations this may not be economically practical given the costs of computing power. Therefore, some advantageous embodiments use an estimator of the true average and/or standard deviation.

In some embodiments, the estimators of the average, $\tilde{x}_i$, and standard deviation, $\tilde{\delta}_i$, at instance i are computed using a sliding window of N samples of the number of cycles of the local oscillator to achieve the true one second period (or other period) reference. The instance at which $\tilde{x}_i$, and $\tilde{\delta}_i$ are updated may be once every occurrence of the 1PPS from the universal one second reference or at a different frequency. It is conceivable that the 1PPS may not be present every second, for example due to loss of GPS satellite visibility. The length of the sliding window, N, may vary over time, or remain fixed.

The length of the sliding window, N, can be increased to increase the amount of filtering of the 1PPS period data. However, this may slow initial convergence and re-tracking and may increase the computational complexity of the implementation.

According to another aspect of the invention, there is provided a method of generating a timing signal comprising the steps of: receiving a first signal indicating successive time intervals; receiving a second signal indicating successive time intervals; and generating a timing signal based on the second signal and on a relationship between one or more time intervals of the first signal and one or more time intervals of the second signal.

According to another aspect of the invention, there is provided a sequence generator for generating a signal indicating a sequence of different states or values, comprising: a first source for providing a clock signal indicating successive time intervals, means for storing a plurality of time segments of a sequence, each time segment having an associated state or value, and means for reading each stored segment and outputting the state or value associated therewith according to said sequence.

According to another aspect of the invention, there is provided an apparatus for generating a timing signal comprising means for receiving a first signal indicating successive time intervals, means for receiving a second signal indicating successive time intervals, means for detecting the start or end of each time interval of said first signal, signal generating means for generating a timing signal based on the time intervals of said second signal, said signal generating means being responsive to the detected start or end of each successive time interval of the first signal to generate a predetermined feature of said timing signal.

Advantageously, the apparatus enables a timing signal which is generated using a local time signal, for example generated by a local oscillator, to be synchronized to another signal, which may be more accurate than the local signal, thereby enabling sources of errors resulting from the local clock signal to be removed to produce a more accurate timing signal.

BRIEF DESCRIPTION OF THE DRAWINGS

Examples of embodiments of the invention will now be described with reference to the drawings, in which.

DESCRIPTION OF EMBODIMENTS

Figure 1:
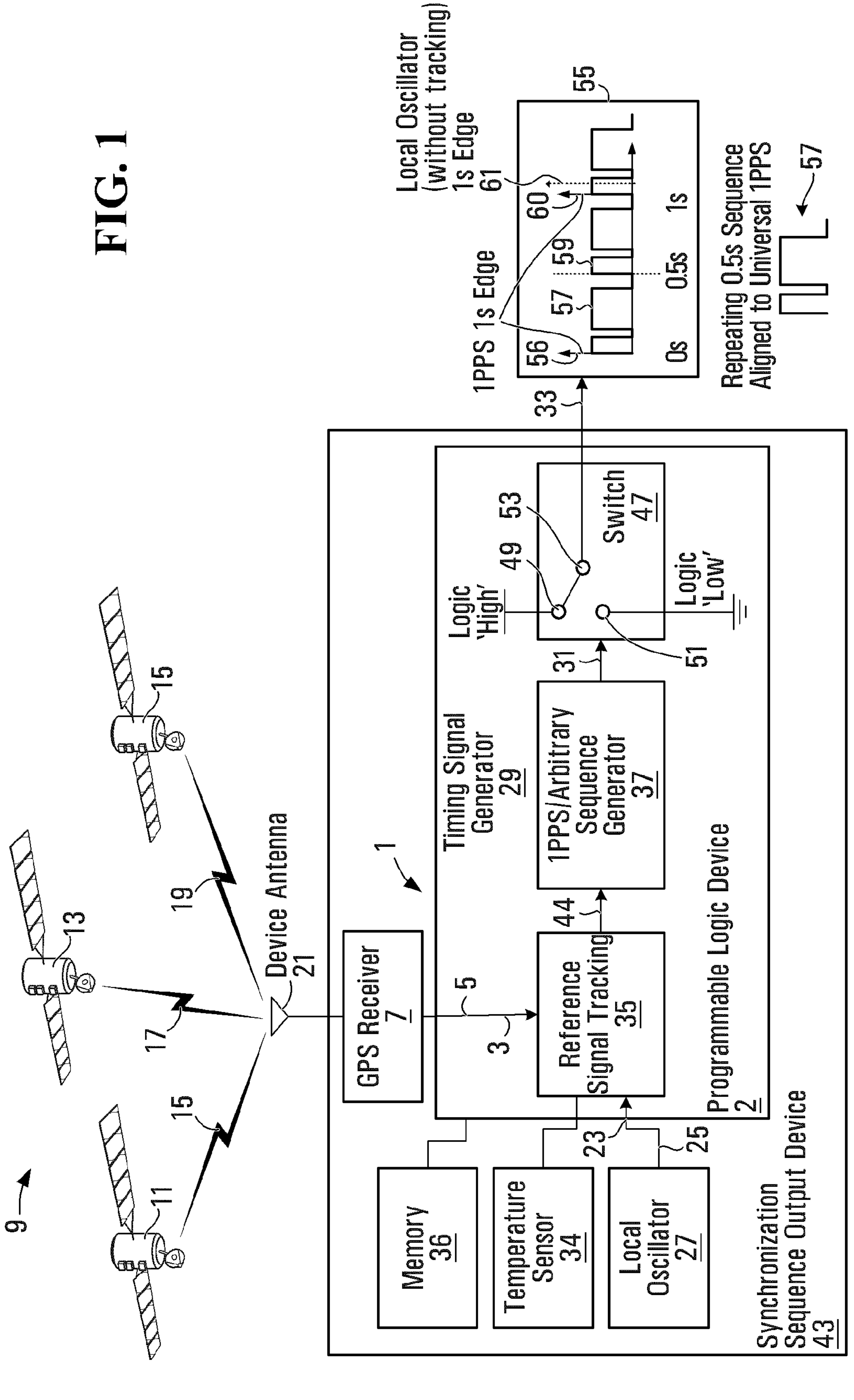
FIG. 1 shows a schematic block diagram of an apparatus according to an embodiment of the invention.

Embodiments of the invention provide an apparatus which generates a timing signal using a local clock source, in which the timing signal period tracks, and may be synchronized to, the period of a reference time signal. Embodiments of the invention are useful when synchronization of a system with a time reference is required. Embodiments of the invention are particularly useful when the time reference may be lost or its quality degrades for periods of time and loss or degradation of the time reference can affect the system's performance. Embodiments of the invention allow accurate tracking and re-generation of a time reference using low cost hardware.

In some embodiments, the apparatus is adapted to synchronize a low-cost, less accurate local clock source, with an arbitrary period, to the globally accepted universal time period. The universal time reference is available from sources such as the global positioning satellite (GPS) network. Some embodiments of the tracking method may be implemented using an algorithm controlling operation of an electronic circuit that is synchronized with a one-pulse-per-second (1PPS) signal obtained from a device such as a GPS receiver module. These embodiments sample the one-pulse-per-second signal, with an implied sampling period error, and generate a mathematical model that averages out any errors to produce an estimate of the actual 1PPS signal for universal time.

The time reference signal may be a common signal, such as a broadcast signal, which is available to a number of devices. The reference signal may be a wireless signal, such as the universal time reference broadcast by the GPS satellite network or another network, system or source. Embodiments of the invention enable geographically separate devices to generate timing signals or output sequences which are synchronized to the common reference and thereby to each other, and may further enable interdevice synchronization and synchronization to the common reference to be maintained if the common reference is lost. Embodiments of the invention also provide an accurate timing signal, which may be used for any purpose, for example, frequency calibration for frequency dependent applications, such as synthesizers.

The accuracy of the period of a typical low-cost local clock source is normally rated in parts per million (ppm) of a manufacturer's nominally specified period. Further, the period will generally change over temperature. A small deviation in the local oscillator period over a small duration can add up to an unacceptable timing drift, depending on the application's drift thresholds. Embodiments of the apparatus take into account these deviations when tracking the reference time signal.

The synchronization source itself that generates the time reference (e.g. 1PPS) signal may deviate around its true mean, as is the case with a GPS receiver, where the 1PPS signal produced by the receiver has sawtooth output waveform. Embodiments of the apparatus enable these deviations to be accounted for when tracking the time reference signal.

Embodiments of the tracking algorithm are quite effective at tracking the period of the reference time signal, e.g. the universal 1PPS, and representing this period in terms of a number of cycles of the local oscillator or clock source. Advantageously, during periods where the time reference (e.g. 1PPS) signal is lost, due to a loss of GPS satellite visibility for example, the local clock source can be used to produce an accurate replicate of the time reference (1PPS) signal.

In some embodiments, the apparatus includes a sequence generator to produce periodic on-off-keying sequences that are required to be synchronized, for example, to the universal time period one second reference obtained from the GPS satellite network. The apparatus can also be used for calibrating frequency dependent devices.

A number of simplifications are disclosed to simplify implementation in a microprocessor, ASIC, FPGA, Programmable Logic Device or Array, or other logic device or electronic circuit, where the number of cycles taken to compute mean and standard deviation operations should be reduced or minimized to reduce the cycle count taken or latency.

A non-limiting example of an apparatus according to an embodiment of the invention is shown schematically in FIG. 1.

FIG. 1 shows an apparatus 1 according to an embodiment of the invention, implemented in a logic device or circuit, for example, a programmable logic device 2. The apparatus 1 has a first input or interface 3 for receiving a first signal 5 indicating successive time intervals. In this example, the signal is a one pulse per second (1PPS) signal from a GPS receiver 7 derived from the GPS satellite network 9. FIG. 1 illustrates three GPS satellites 11, 13, 15, each broadcasting a wireless RF signal 15, 17, 19 containing universal time information, and which are received by the GPS receiver antenna 21.

The apparatus further comprises a second input or interface 23 for receiving a second signal 25 indicating successive time intervals. In this example, the second signal is provided by a local clock source or oscillator 27. The local oscillator may generate a clock signal having any frequency, for example, 1 MHz. In this case each successive time interval or period has a duration of 1 microsecond.

The apparatus includes a generator 29 which is adapted to generate a timing signal 31, 33 based on the second (e.g. local oscillator) signal and on a determined relationship between one or more time intervals of the first (e.g. 1PPS) signal and one or more time intervals of the second signal. The relationship allows time intervals indicated by the timing signal to be based on a first, e.g. accurate time source, for example universal time, using a local time source, e.g. local oscillator, so that the timing signal can continue to track the first, accurate time source in the event that the first time source becomes unavailable. For example, it may be determined that the local oscillator actually generates a signal having a frequency of 970 kHz, rather than its nominally rated frequency of 1 MHz. The determined relationship between the time intervals in the first and second signals can be expressed as the number of time intervals of the second signal in one time interval of the first signal, in this case 970,000 (assuming the first signal is a one-pulse-per-second signal). The generator may use this relationship and the second signal to generate a timing signal having a one second period, where the one second period is equal to the one second period of the first signal. In this case, the one second period can be expressed as $x_i T_{CLK}$, where $x_i$ is the number of local clock cycles in a one second period (indicated by the first signal), and $T_{CLK}$ is the period of the local clock.

The relationship may be determined from a measurement of the number of time intervals of the second signal in a time interval of the first signal (or vice versa). The measurement may be made over a number of time intervals of the signal having time intervals of the longer period or duration. The filtered average number of time intervals, of one signal in the other signal may be determined, and used to generate the timing signal. In some embodiments, a single predetermined relationship may be used to generate the timing signal. In other embodiments, where the relationship is dependent on one or more variable(s), such as the temperature of the local oscillator or other phenomena affecting the local oscillator, a particular relationship for generating the timing signal may be selected from a number of different relationships, depending on the value(s) of the variable(s), e.g. temperature.

In some embodiments, the apparatus is capable of determining the relationship between the number of time intervals of the first and second signals. Some embodiments are adapted to determine the relationship periodically or continuously, in real time, by monitoring the first and second signals periodically or continuously. The apparatus may, for example, determine the relationship for successive samples or measurements and use successively determined relationships to generate the timing signal. Each successive sample may be the number of time intervals of the second signal in a time interval of the first signal. Each successive sample may be a measurement of the number of time intervals of the second signal in a certain number of time intervals of the first signal, and the relationship may be the average number of time intervals of the second signal in a time interval of the first signal. In some embodiments, the average may be determined using all samples taken. In other embodiments, the number of samples used to calculate the average may be limited to a select number to provide an estimator of the mean, $\tilde{x}_i$. For example, each average may be determined from N most recently measured values of the number of time intervals of the second signal in a time interval of the first signal. The values used to determine each average may thus be selected by a sliding window of length N, where the sliding window slides, for example, to include the newest sample as it becomes available, and to discard the previous oldest value in the previous window, assuming the length of the sliding window is constant. In other embodiments, the length of the sliding window may be varied with time. Using a limited number, N, of samples for calculating the average means that older values are not used in the calculation. Advantageously, this reduces exposure of the new calculated average to possibly poor measurements of the past, thereby making the updated calculation more accurate. However, in other embodiments, all historical measurements could be used for each new calculation of the average.

The time interval of the 1PPS signal provided by the GPS receiver may itself fluctuate about a mean value. Measuring the number of time intervals or periods of the local oscillator in each of a number of time intervals of the 1PPS signal, and determining from the measured values, the average number of time intervals of the local oscillator signal in a time interval of the 1PPS signal, assists in smoothing out these fluctuations and reducing any excursion from the true time interval, e.g. 1 second, in the timing signal generated by the generator.

In some embodiments, the apparatus is adapted to determine the value of a parameter indicative of the deviation of the measured number from the average value. The parameter may be used by the apparatus to control operation thereof, e.g. in a decision making process. For example, the value of the parameter may be used to determine whether or not the determined average value is valid and whether or not it is to be used in generating the timing signal.

The timing signal generator 29 includes a reference signal tracking module 35, for tracking the reference signal 5, and a sequence generator 37 for generating a sequence of states or values which are output as the timing signal 31. The timing signal 31, may be any desired timing signal, including a replicate of the reference signal or any arbitrary sequence.

Figure 2:
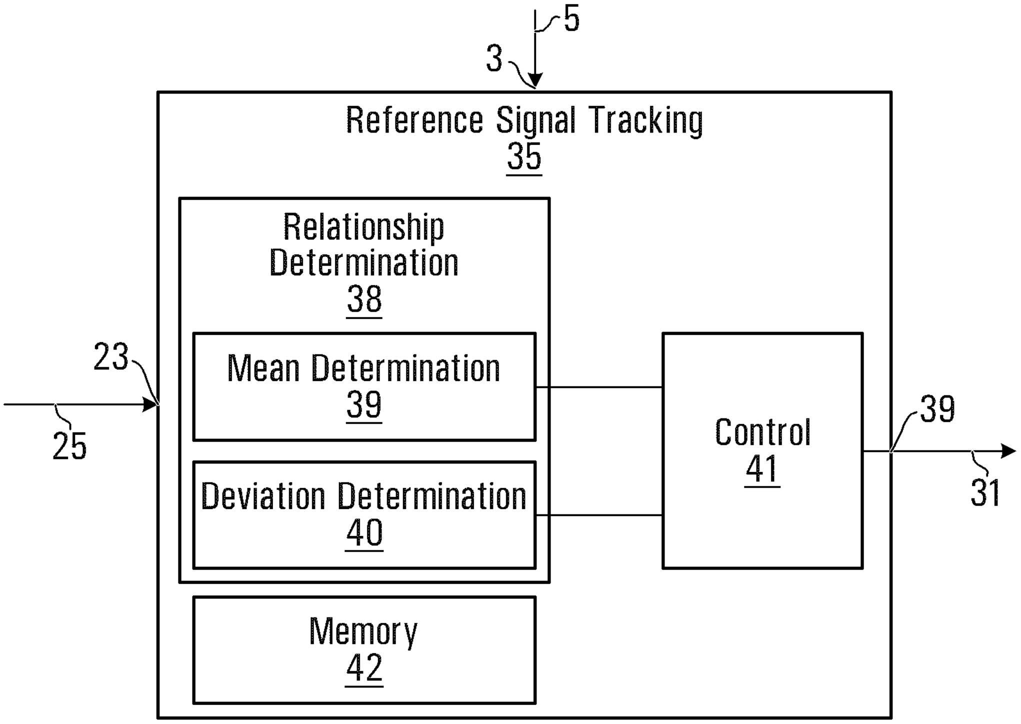
FIG. 2 shows a schematic block diagram of a timing signal generator according to an embodiment of the invention.

FIG. 2 shows an embodiment of the reference signal tracking module 35 in more detail. The reference signal tracking module includes a relationship determination module 38 for determining the relationship between time intervals indicated by the reference signal 5 and time intervals indicated by the local oscillator signal 25. In this embodiment, the relationship determination module includes a mean determination module 39 which determines the average or mean number of time intervals of the local oscillator signal in a time interval of the reference signal, and a deviation or difference determination module 40 for determining the standard deviation of the number or another value indicative of a difference between one or more measured numbers and the average number.

The tracking module further includes a control module 41, for controlling the generation of the timing signal based on the determined relationship, in this example, the determined mean value and the standard deviation. In particular, embodiments of the control module may be adapted to perform any one or more of the following functions: (1) control the initiation or start of generating the timing signal, (2) provide an indication that a valid start or end of a time interval of the reference signal 5 has been received/detected, this being used by the sequence generator 37 to start the generation of a next sequence, and (3) provide the value of one or more variables to the sequence generator, such as the values of the mean and deviation determined by modules 39 and 40, any variable based thereon, or any other parameter used by the sequence generator to generate a timing signal. In other embodiments, any one or more of the above functions may be implemented by the sequence generator or one or more separate modules, whether implemented in hardware and/or software.

The modules of the reference tracking module may be implemented in software, hardware or a combination of both.

The reference tracking module may include a memory 42 for storing the determined values, other variables and/or instructions.

Returning to FIG. 1, in this embodiment, the apparatus is implemented in a synchronization sequence output device 43.

In the present embodiment, the sequence generator 37 is responsive to an indication 44 of the detection of a start or end of a time interval of the reference signal to initiate the generation of the timing signal. This enables synchronization of the start of the timing signal to the reference signal. The sequence generator is responsive to the detection of a valid start or end of a time interval of the reference signal to generate the start of a next sequence. This enables continuous synchronization of the timing signal to the reference signal as long as the reference signal is present. The sequence generator is responsive to the absence of an expected indication of the detection of a valid start or end of a time interval of the reference signal to generate or continue to generate the timing signal based on the second signal, e.g. local oscillator or clock signal 25, and on the determined relationship between the first (reference) signal and the second signal, as provided, for example by the tracking module 35.

The sequence generator may be adapted to resume generating the timing signal based on detected time intervals of the reference signal, rather than on the determined relationship, after valid detection of the reference signal is established again.

In this embodiment, the timing signal 31 is used to control the on/off switching of a switch or switching device 47. In this example, the switch has input terminals 49, 51 coupled to high and low voltage levels, respectively, indicative of high and low logic states, and an output terminal 53. The switch is activated by the control signal 31 from the sequence generator 37 to switch the output terminal 53 between low and high states according to the sequence generated, an example 55 of which is shown in FIG. 1.

In the example of the sequence shown in FIG. 1, the sequence produced by the sequence generator is repeated every 0.5 seconds. The trace 55 shows two sequential instances 57, 59 of the 0.5 second sequence, in which the start of the first instance is aligned with the starting edge 56 of the 1PPS pulse of the reference signal 5, and the start of the second instance is aligned with a time corresponding to 0.5 seconds from the starting edge of the 1PPS pulse. FIG. 1 also shows the starting edge 60 of the next 1PPS pulse of the reference signal 5 occurring 1 second after the previous edge. The accurate tracking of the 1PPS pulses of the reference signal ensures that a sequence starts at the start of each second, that the end of a sequence can end at the end of each second, and that, in the present two sequence per second example, two sequences can fit precisely into each 1 second interval.

FIG. 1 shows an example of the possible position in time of the starting edge 61 of a next 1 second pulse, if the 1PPS timing signal were to be generated by the local oscillator without implementing the inventive tracking and timing generation method. In this case, the start of each sequence is generated on the basis of the nominal number of clock cycles in a one second period. In this example, the next 1 second edge occurs more than 1 true second after the previous 1 second edge, due for example to inherent inaccuracies of the local oscillator, the influence of temperature and/or other factors such as age of components of the local oscillator, which result in changes in the clock frequency from its nominal value. Embodiments of the apparatus effectively reduce these errors to enable a more accurate timing signal to be generated. This allows timing sequences to be accurately generated. Where the timing signal with or against which the local oscillator is calibrated or corrected is available to more than one device, the apparatus allows the operation of different devices to be synchronized to one another. The ability of the apparatus to generate an accurate timing signal, for example an accurate replicate of the 1PPS time signal, allows frequency calibration for frequency generators (e.g. synthesizers) and other devices where accuracy of frequency is important or desirable.

Algorithm

Non-limiting examples of various steps that may be performed in generating a timing signal are described below, assuming that the first signal is a 1PPS signal.

Startup

At startup, the system may be adapted to start counting the number of local oscillator cycles (i.e. time intervals or periods) until a valid 1PPS edge is present. The number of cycles (periods) until a valid 1PPS edge may be denoted $x_i$.

The number, N, of samples of the mean can be set to an initial value of zero.

Tracking

The number of local clock cycles, $x_i$, at every instance, i, where a valid 1PPS edge occurs may be used to compute the estimator of the average and standard deviation as follows:

Discard Invalid 1PPS Sample

Discard any values of $x_i$ for which the value of $x_i$ is obviously invalid. For example, if the local oscillator frequency is 50 MHz, a discard criteria could be to discard any cycle counts with an error of 100 ppm (parts per million) or more, in this example, an error of +/−5000 cycles or more. This discard step accounts for startup and retracking issues that occur during the course of the tracking procedure, by eliminating invalid values of $x_i$ that may occur at these times, so that they are not used in the calculations.

Compute the Estimator of the Mean

The average number of time intervals or cycles of the local oscillator in a time interval or period of the 1PPS signal may be determined as an estimator of the mean, using a limited number N of samples, defined, for example, by a sliding window.

The estimator of the mean may be computed as the estimator of the mean, $\tilde{x}_i$, at instance i with sliding window of length N, where $$\tilde{x}_i = \frac{1}{N}\sum_{k=0}^{N-1} x_{i-k}$$

Compute the Estimator of the Standard Deviation

An estimator of the standard deviation may be computed on the basis of a limited number of samples. In one embodiment, the estimator of the standard deviation may be determined as the estimator of the standard deviation, $\tilde{\delta}_i$, at instance i with sliding window of length N, using the equation:

$$\tilde{\delta}_i = \frac{1}{N}\sum_{k=0}^{N-1} |\tilde{x}_{ik} - x_{i-k}|$$

This is a crude estimator of the standard deviation. It is significantly simplified to ease computational requirements. In particular, the square root and squaring functions of the standard equation have been removed. The subtraction operation has also been simplified from the more standard $\tilde{x}_i - x_{i-k}$ to $\tilde{x}_{i\ k} - x_{i-k}$, such that only one subtraction operation is required per standard deviation update instead of N subtractions. A sliding window buffer can easily be implemented in various processor and programmable logic device (e.g. FPGA) architectures using the modified differencing operation.

Update Best Estimator of the Mean

When the estimator of the mean, $\tilde{x}_i$, is deemed to be accurate, based on a comparison of the determined estimator of the standard deviation, $\tilde{\delta}_i$, with a threshold value, $\delta_T$, a parameter, which will be referred to as the best estimator of the mean, $\bar{x}_i$, is updated to match $\tilde{x}_i$, so that:

$$\bar{x}_i = \tilde{x}_i \text{ if } \tilde{\delta}_i < \delta_T$$

or in another embodiment, where $$\bar{x}_i = \tilde{x}_i \text{ if } \tilde{\delta}_i \leq \delta_T$$

Decreasing the threshold, $\delta_T$, may increase the accuracy of the results for the best estimator of the mean, but will generally increase the initial convergence and re-tracking times.

Reset Local Oscillator Count

The number of local oscillator cycles counted in the previous 1PPS sample may be reset by:

(1) incrementing to the next iteration, $$i = i + 1$$

and, (2) resetting the number of local clock cycles, $$x_i = 0.$$

Local 1PPS Generation

In some embodiments, the best estimator of the mean, $\bar{x}_i$, is used to generate a local copy of the 1PPS reference signal at all times to provide a filtered estimator of the universal 1PPS period, $\bar{x}_i T_{CLK}$, with fewer fluctuations from second to second.

In some embodiments, the generated timing signal may be aligned with the universal 1PPS signal. For example, the generated, local 1PPS signal may always be aligned with a valid universal reference 1PPS edge whenever the edge is considered valid. A determination of whether or not the universal reference edge is valid may be based, for example, on a comparison of the best known estimator of the mean, $\bar{x}_i$, with the current number of cycles, $x_i$, using, for example, the criterion:

$$|\bar{x}_i - x_i| < \delta_E$$

where $\delta_E$ is the 1PPS edge threshold. $\delta_E$ can be equal to $\delta_T$ or another value, dependent on the implementation in question.

Better accuracy in the time interval (e.g. 1 second) indicated by the generated timing signal, may be achieved if the best estimator of the mean, $\bar{x}_i$, is stored with its fractional portion, if any, and the integer and fractional portions are used to generate the local 1PPS reference.

The estimator of the mean can be determined periodically or continuously based on the most recent, N, samples, for example, as long as the 1PPS reference signal is present. The best estimator of the mean can be continuously updated based on the most recent, valid value, and used to generate the timing signal. However, if the 1PPS reference signal disappears, the estimator of the mean cannot be calculated accurately. In this case, the timing signal may be generated using a previously determined valid value of the best estimator of the mean, which may or may not be the last determined valid value just prior to the disappearance of the 1PPS reference signal.

Further Refinements

The tracking algorithm can have variable thresholds, $\delta_T$, for updating the best mean estimator. For example, during startup, the threshold $\delta_T$, can be set to a larger value, to allow quicker startup tracking, and then reduced after some time interval has elapsed (nominally once steady-state operation has been achieved) for better accuracy.

The algorithm can be made more robust for tracking purposes when the 1PPS reference is missing, by using a value of the best estimator of the mean which is corrected for temperature of the local oscillator and/or apparatus, depending on which components are temperature sensitive. The best estimator of the mean may be corrected by measuring the local temperature, e.g. using a temperature sensor 34 (FIG. 1) and using a calibration curve, a mathematical (e.g. polynomial) expression, correction factor, or other mathematical technique which relates the mean value to temperature, to determine the correct value for of the best estimator of the mean for that temperature. Alternatively, or in addition, the apparatus may include a number of stored temperature dependent values for the best estimator of the mean $\bar{x}_i$, available, for example, in a memory, e.g. optional memory 36 or 42 (FIGS. 1 and 2) and which may be stored in a look-up table or other format. The appropriate value for the best estimator of the mean may be determined from the stored values and the sensed temperature. Computationally this may require only minor amounts of additional memory. In some embodiments, the values of the best estimator of the mean to be stored and used for temperature compensation may be measured values, for example, the most recent, valid measured value at a particular measured value of temperature. Where the temperature at which a value of the best estimator of the mean has been measured and stored, corresponds to the temperature at which a new valid value of the best estimator of the mean is determined, the stored value may be replaced by the new value. In some embodiments, at each instance of $\bar{x}_i$, the value is stored in a table indexed on temperature available from a temperature sensor.

In any embodiment, when the 1PPS reference signal is lost, the current temperature may be used to determine which estimator of the mean will be used to generate the timing signal.

A more specific, non-limiting example of a method for determining the best estimator of the mean will be described with reference to the flow diagram of FIG. 3.

Figure 3:
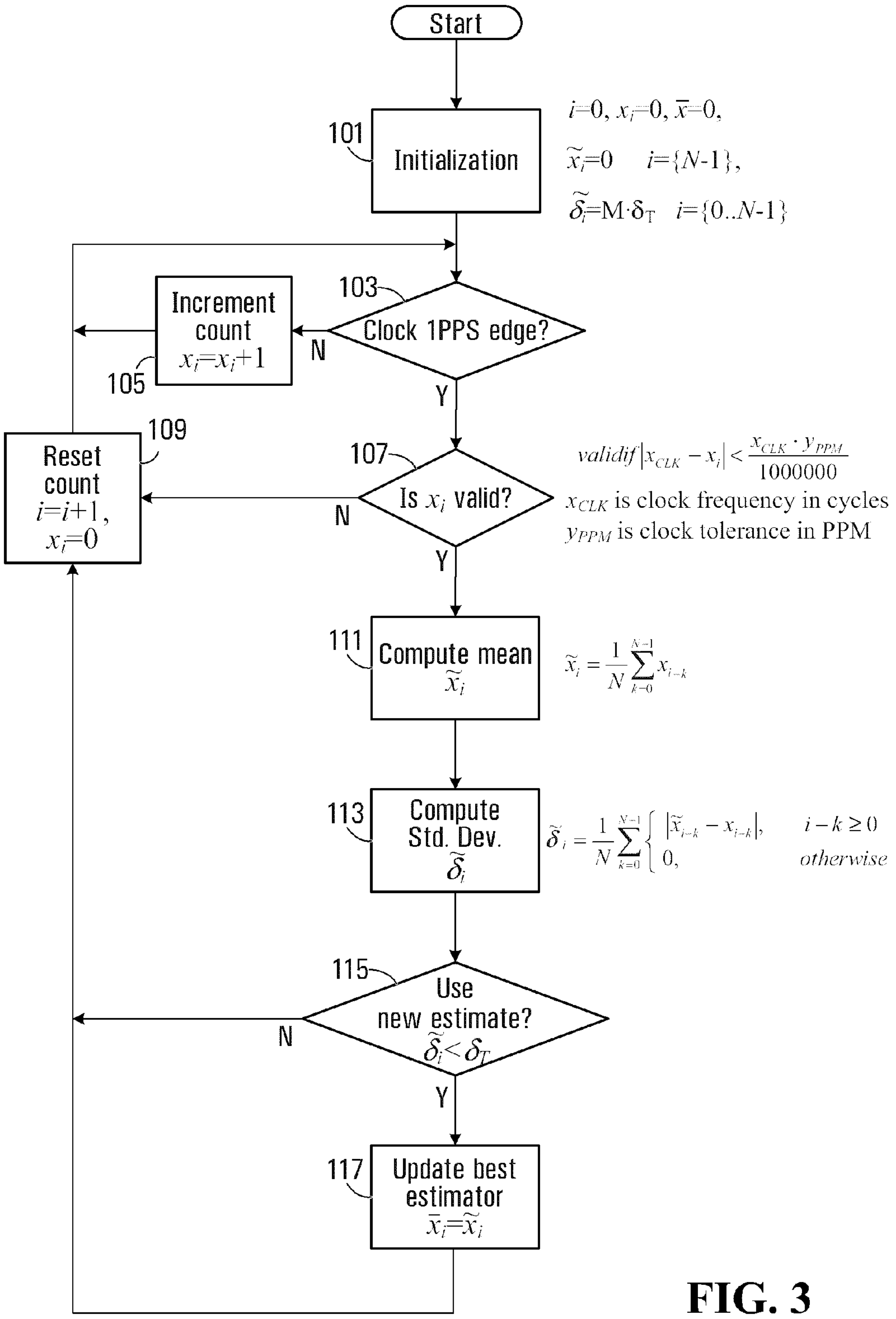
FIG. 3 shows a flow diagram illustrating a method of determining parameters for generating a timing signal according to an embodiment of the invention.

Referring to FIG. 3, the method starts with initialization of certain variables at step 101. The estimator of the standard deviation is set at an invalid value, i.e. larger than the threshold value. At step 103, a determination is made as to whether or not a clock edge of the reference 1PPS signal is present at that instance. This may be detected by the logic device looking for a transition in the level of the reference 1PPS signal from one local oscillator clock period to the next.

If a clock edge is not present, the method proceeds to step 105, in which the sample count i.e. the number of counted local oscillator cycles is incremented by 1. The process then returns to step 103, where it is again determined if a clock edge is present at that instance. The process cycles between steps 103 and 105, thereby counting the number of local oscillator cycles until a reference 1PPS clock edge is detected, at which point, the process advances to step 107. At step 107, a determination is made as to whether or not the value of the counted number of local oscillator cycles is valid. The determination may be made by calculating the difference between the counted number of cycles, $x_i$, and the nominal clock frequency, i.e. number of clock cycles per second, $x_{CLK}$, and evaluating whether this difference is within the clock tolerance, y, which may be expressed as the error in parts per million of the clock frequency. An example of the inequality is shown in FIG. 3.

If the cycle count, $x_i$, is not valid, the process passes to step 109, where the sample or iteration number, i, is increased by 1, and the count number is reset to 0. The process then returns to step 103, and counting of the number of local oscillator cycles begins again and continues until an edge of the 1PPS signal is detected.

If, at step 107, it is determined that the counted number of local oscillator cycles is valid, the process advances to step 111, at which the mean value of the count, $\tilde{x}_i$, is determined, using, for example, a limited number, N, of measured counts. The counts used in calculating the average or estimator of the mean may be stored values, and may either be restricted to valid values only, or not so restricted.

Next, the process advances to step 113, where a value for an estimator of the standard deviation, $\tilde{\delta}_i$, is determined, using, for example, the equation indicated in FIG. 3, or a different equation.

The process then passes to step 115, at which a decision is made as to whether or not to use a new estimator of the mean to generate the timing signal. For example, this decision may be based on whether the most recently determined estimator of the standard deviation is less than (or is less than or equal to) a threshold value.

If the estimator of the standard deviation does not meet the requisite criteria, the best estimator of the mean is not updated, and the process returns to step 109, to start the next sample. In this case, the previous value of the best estimator of the mean may be used to generate the timing signal.

If the estimator of the standard deviation meets the requisite criteria, the best estimator of the mean $\bar{x}_i$ may be updated with the most recently determined estimator of the mean, $\tilde{x}_i$, as indicated in step 117. Thereafter, the process returns to step 109 to reset the local oscillator cycle count and increment the iteration number to begin sampling the next local oscillator cycle.

As indicated above, the threshold value of the standard deviation, $\delta_T$, used in step 115, may either be a fixed value, or may be varied, depending, for example, on whether the tracking process is at start up, in the process of regenerating the estimator of the mean after the reference signal has reappeared after being lost, or on the desired rate of convergence.

Figure 4:
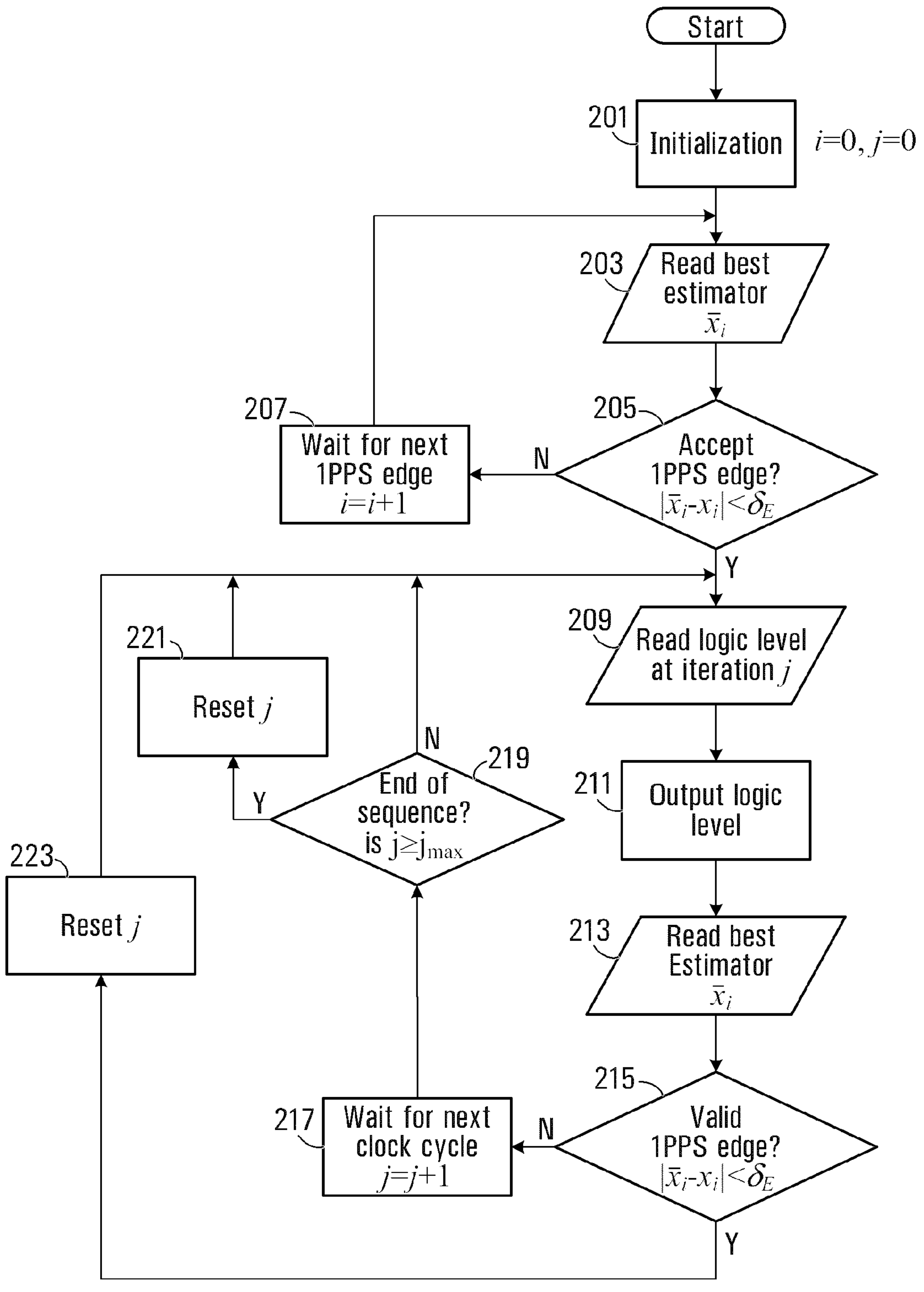
FIG. 4 shows a flow diagram illustrating a sequence generating method according to an embodiment of the invention.

FIG. 4 shows a flow diagram illustrating a non-limiting example of a method for generating a sequence, according to an embodiment on the invention.

In this example, a sequence is a series of consecutive time intervals, each interval having an associated state or value. Each time interval (and associated state or value) is numbered consecutively in the order in which it appears in the sequence. In this example, the variable 'j' represents the time interval, j=0 represents the first time interval of the sequence, $j_{max}$ represents the number of time intervals in the sequence, and $j=j_{max}-1$ represents the last time interval of the sequence. The length of the sequence is entirely arbitrary. In one non-limiting example, the length of the sequence is 0.5 seconds, as for the sequence shown in FIG. 1, although it could be any other length, as required. For example, the length of the sequence may be the same length as the reference time interval (e.g. 1 second), or a fraction or multiple thereof. In this example, the length of the sequence is 0.5 seconds and the algorithm is designed to repeat the sequence at each 0.5 second interval.

Referring to FIG. 4, the process starts at step 201 by initializing variables i and j. The process then advances to step 203, at which the best estimator of the mean, $\bar{x}_i$, is read. ($\bar{x}_i$ may be determined using the method of FIG. 3 or any other suitable method.) A determination is then made at step 205 as to whether or not the locally generated 1PPS edge is valid. This may be done by comparing the best estimator of the mean, $\bar{x}_i$, with the current number of counted local oscillator cycles. In the present embodiment, this determination is made by determining the difference between the best estimator of the mean and the count value and determining if the difference meets a predetermined criteria, for example is less than (or is less than or equal to) a threshold value, $\delta_E$.

If the 1PPS edge is not valid, the process passes to step 207, waits for the next 1PPS edge and increments variable i. Once the next edge is received, the process returns to step 203.

If the 1PPS edge is determined to be valid, the process advances to step 209, at which a logic level (or other value) at iteration j is read, and is subsequently output at step 211. Next, the best estimator of the mean is read at step 213, and a determination is made at step 215 as to whether there is a valid locally generated 1PPS edge. In this embodiment, this is done by comparing the present number of local oscillator cycle counts with the best estimator of the mean. If the numbers are equal to within a specified tolerance, $\delta_E$, the process determines that a valid edge is present. If it is determined that a valid edge is not present, the process advances to step 217, waits for the next clock cycle and increments j. The process then passes to step 219, at which a determination is made as to whether or not the end of the sequence has been reached. In this example, the determination is made by determining whether the maximum number of iterative steps in generating a sequence has been reached. If the maximum number of iterative steps, $j_{max}$, required generate a complete sequence has not been reached, the process returns to step 209, at which the logic level for the new, incremented value of j is read and output at step 211. The process continues to generate sequential portions or segments of the sequence until the last segment of the sequence corresponding to $j=j_{max}-1$ is output. At step 217 j is incremented to $j_{max}$, the end of sequence condition is met at step 219, j is reset (e.g. to zero) at step 221, and generation of the next 0.5s sequence is started at steps 209 and 211. The process continues to generate sequential portions or segments of the next 0.5 s sequence until either a new valid 1PPS edge is detected at step 215, or before a new valid edge is detected, it is determined at step 219 that the sequence being generated is complete. In this case, at step 221, j is reset (for example to 0) to start the generation of a new sequence. If j is reset to zero or the same starting value as the previous sequence and the logic levels for each value of j do not change, the next sequence will correspond to the previous sequence, and the same sequence will simply be repeated. On the other hand, if j is reset to a different starting value and/or the value of the logic level for one or more values of j changes, successive sequences can be varied.

It will be appreciated that the method may be used to generate any arbitrary sequence in a time interval of the generated timing signal, for example between sequential edges of a 1PPS signal. The sequence may be repeated one or more times within the time interval. In other embodiments, if a sequence pattern spans more than one time interval, for example 2 or more time intervals, the method may be modified to accommodate the sequence. This may be done by modifying step 215, for example, to ignore every other valid edge for a sequence pattern spanning two time intervals, or, in general terms to ignore every n−1 valid edge to accommodate sequence patterns spanning n time intervals.

The detection of a valid edge at step 215 overrides the continued generation of a sequence. In the embodiment of FIG. 4, if a valid edge is detected at step 215, the process passes to step 223, at which the sequence portion count, j, is reset to zero or set to another value, and the routine returns to step 209, to begin the generation of a new sequence. This forces alignment of the start of a new sequence with the edge or start of a new time interval (e.g. 1 second time interval), and thereby synchronizes the sequence to the timing signal periodically, for example each time a valid edge is detected at step 215, or is determined for use to synchronize the sequence to the timing signal. This latter case may be employed, for example, where not all valid edges are used for synchronization, e.g. where the sequence pattern spans more than one time interval.

As mentioned above, a sequence will continue to be generated as long as a valid 1PPS edge is not detected. If the end of the sequence (as indicated by $j=j_{max}-1$) is reached before a valid edge is detected, j is reset, for example to zero at step 221 and the process starts to generate a new sequence. If a valid 1PPS edge is then detected at some time after generation of this next sequence has begun, j will again be reset, for example to zero at step 223, and generation of this next sequence will begin again.

In some implementations, it may be desirable to generate successive sequences (either identical or non-identical) in which the beginning and end of each sequence coincides with one or more complete time intervals of the timing signal. In the embodiments described above, the timing signal has a time interval of one second and is signified either by a decision that a valid 1PPS edge is detected or a certain number of clock cycles have been counted since the last valid 1PPS edge was detected. With reference to FIG. 4, this latter indication is signified when the variable $j=j_{max}-1$. In designing a sequence to exactly fit within a time interval of the timing signal, the value of $j_{max}-1$ may correspond to the number of local clock cycles within the time interval. Thus, $j_{max}-1$ may be set to a value based on the specification of a manufacturer of the local oscillator clock. On the other hand, the clock frequency of the specific local oscillator supplied by the manufacturer may be measured and the value of $j_{max}-1$ set accordingly. However, whichever value of $j_{max}-1$ is used for the sequence, the number of clock cycles in a one second period may vary from time to time, for example due to local effects such as temperature variations. In this case, the number of clock cycles in the intended time interval of a complete sequence will not always correspond to $j_{max}$. Returning to FIG. 4, when the local clock is running faster, a generated sequence will end before the time interval and therefore part of the next sequence will appear towards the end of that time interval. On the other hand, when the local oscillator clock is running slowly, the time interval will end before a complete sequence has been generated. In some cases, neither of these results may be significant. If the local oscillator clock is particularly accurate and there is little variation in clock frequency over time, only minimal truncation of a sequence or contamination of one sequence by the start of another will occur, which in some applications may be tolerable. However, in other embodiments, it may be desirable to implement a more flexible approach which allows a sequence to fit within a time interval defined by the timing signal and allows for variation in the frequency of the local clock oscillator. An example of an embodiment which is capable of implementing a more flexible approach is described below with reference to FIGS. 5 and 6.

Figure 5:
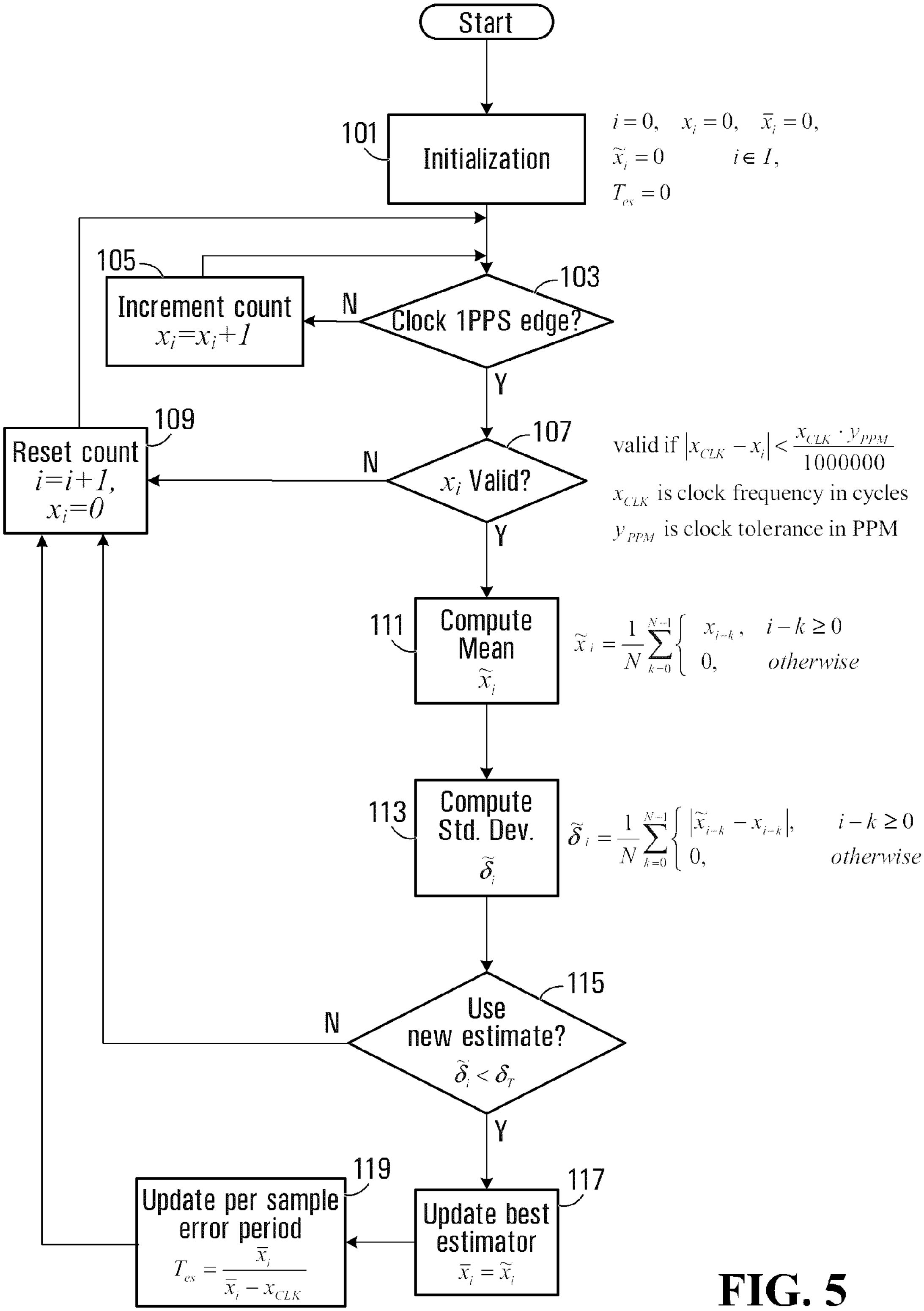
FIG. 5 shows a flow diagram illustrating a method of determining parameters for generating a timing signal according to another embodiment of the present invention.

FIG. 5 shows a flow diagram of a method for determining the best estimator of the mean according to another embodiment of the present invention. The method is similar to that described above with reference to FIG. 3 and similar steps are designated by the same reference numerals. The description of each step of FIG. 3 applies equally to each step of FIG. 5. The main difference between the method of FIG. 3 and that of FIG. 5 is that the method of FIG. 5 introduces a new variable $T_{es}$, also referred to as the per sample error period, where $$T_{es} = \frac{\bar{x}_i}{\bar{x}_i - x_{CLK}}.$$

The per sample error period is the number of clock cycles within the total number of clock cycles in a sample before a correction is required to account for the difference between the nominal number of clock cycles in the complete sample and the number of clock cycles in a complete sample as determined by the best estimator of the mean, $\bar{x}_i$. When designing a sequence having a particular period (e.g. one second), the total number of time segments within the sequence period, $j_{max}$, may be set to the total number of nominal clock cycles $x_{CLK}$ within the sequence period. However, if the actual number of clock cycles in a sequence period as determined by the best estimator of the mean changes from the nominal value, $x_{CLK}$, a correction is applied when generating the sequence to allow the sequence, which has a fixed number of sequence segments, $j_{max}=x_{CLK}$, to better fit within the actual sequence period whose total number of clock cycles is $\bar{x}_i$. As indicated above, the per sample error period is the number of clock cycles over the total number of clock cycles in a sample (or sequence period) before a correction is required or applied. Thus, for example if the nominal number of clock cycles in the sample or sequence period is 100 and the best estimator of the mean, $\bar{x}_i$, is 99, the per sample error period, $T_{es}=-99$, indicating that a correction is required after 99 clock cycles. For the same nominal number of clock cycles per sample period, if the best estimator of the mean is 98, the per sample error period, $T_{es}$ is −49, indicating that a correction is required after each period of 49 clock cycles within the total sample period.

Referring to FIG. 5, the method starts with the initialization of certain variables at step 101, including the new variable $T_{es}$. The method proceeds from step 101 through to step 117 as for the method described above in relation to FIG. 3. After step 117 in which the best estimator of the mean $\bar{x}_i$ is updated, the value of the per sample error period, $T_{es}$ is determined at step 119 using the updated value of the best estimator of the mean. Thereafter, the process returns to step 109 to reset the local oscillator cycle count and increment the iteration number to begin sampling the next local oscillator cycle.

Figure 6:
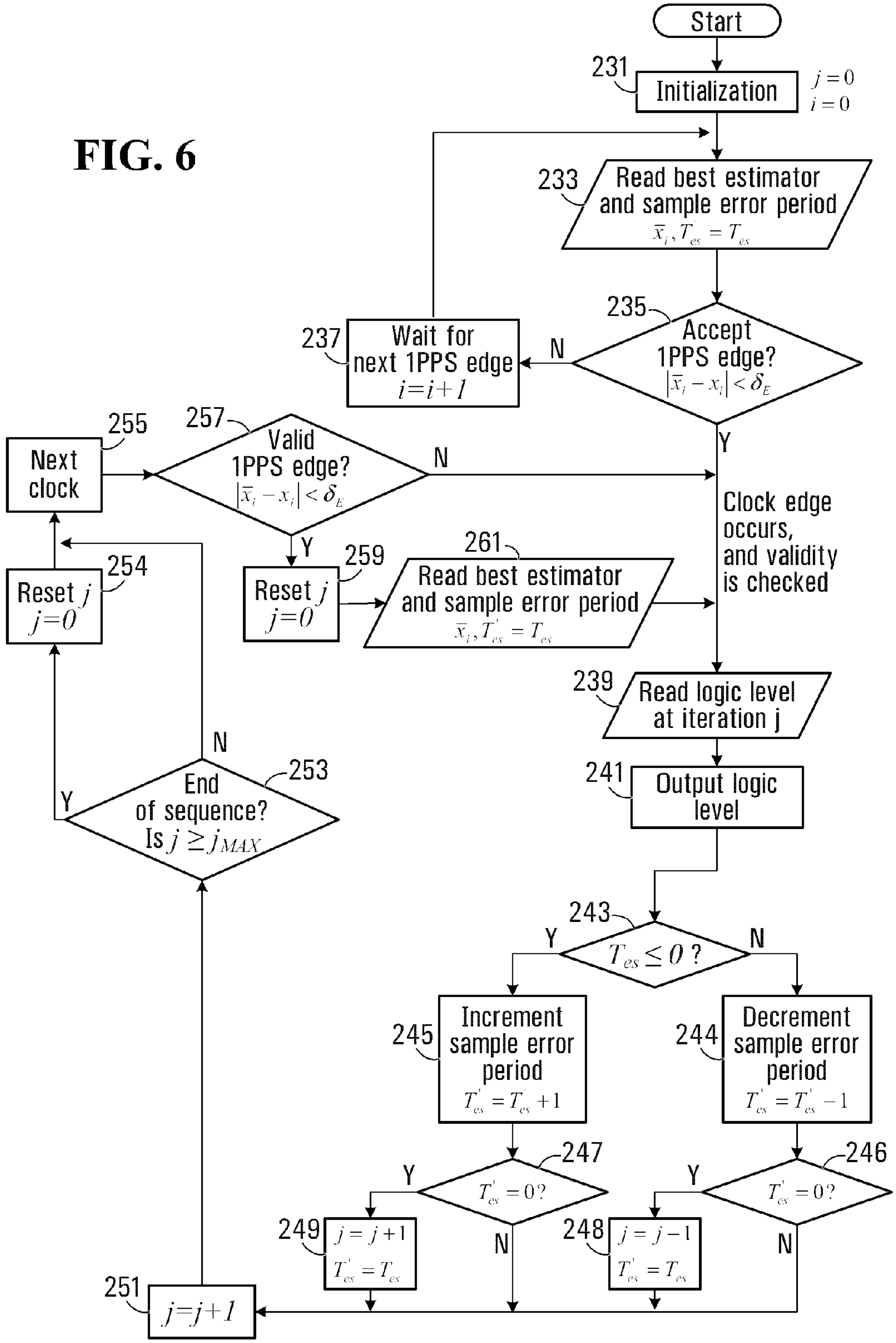
FIG. 6 shows a flow diagram illustrating a sequence generating method according to another embodiment of the present invention.

FIG. 6 shows a flow diagram illustrating a method for generating a sequence using the per sample error period $T_{es}$ to correct for differences between the nominal number of clock cycles, $x_{CLK}$ in a sample or sequence period and the number of clock cycles in the sample or sequence period as determined by the best estimator of the mean, $\bar{x}_i$.

Referring to FIG. 6, the process starts at step 231 by initializing variables i and j. The process then advances to step 233 at which the best estimator of the mean, $\bar{x}_i$, is read, the value of $\bar{x}_i$ being determined, for example, by the method of FIG. 5, or any other suitable method. At step 223, a local copy, $T'_{es}$ of the per sample error period $T_{es}$, as determined for example by the method described above with reference to FIG. 5, is made.

A determination is then made at step 235 as to whether or not the locally generated 1PPS edge is valid. This may be done by comparing the best estimator of the mean, $\bar{x}_i$, with the current number of counted local oscillator cycles at which the edge is detected. In the present embodiment, this determination is made by determining the difference between the best estimator of the mean and the count value and determining if the difference meets a predetermined criteria, for example, is less than (or is less than or equal to) a threshold value, $\delta_E$.

If the 1PPS edge is not valid, the process passes to step 237, waits for the next 1PPS edge and increments variable i. Once the next edge is received or detected, the process returns to step 233.

If the 1PPS edge is determined to be valid, the process advances to step 239, at which a logic level (or other value) at iteration j is read, and is subsequently output at step 241.

The process then passes to step 243, at which a determination is made as to whether the per sample error period is less than or equal to zero. If the per sample error period is negative or zero, which indicates that the actual clock frequency is lower than the nominal clock frequency, the method passes to step 245 in which the local copy of the per sample error period is incremented by 1. A determination is then made at step 247 as to whether the local copy of the per sample error period $T'_{es}$, after incrementation is zero. If No, the method passes straight to step 251, in which the value of j is incremented by 1. If Yes, the method passes to step 249 in which the value of j is incremented by 1 and the per sample error period local copy $T'_{es}$ is reset to the determined per sample error period $T_{es}$. The process then advances to step 251, in which the value of j is incremented again by 1. With the local oscillator clock running at a slower rate than the nominal clock rate $x_{CLK}$, the sequence, which depends on the clock rate, is also generated at a slower rate so that it takes a longer time to generate the full sequence than the time period for which the sequence was originally designed based on $x_{CLK}$. The present embodiment of the method automatically adjusts generation of the sequence to fit within the desired sequence period when the clock rate is lower than the nominal clock rate by skipping the generation of one sequence segment after each generation of the number of sequence segments within the per sample error period, as implemented by steps 247, 249 and 251, at the end of which, j is effectively incremented by two, rather than one.

Returning to step 243, if it is determined that $T_{es}$ is positive, the local oscillator frequency is higher than the nominal frequency. In this case, the method passes to step 244 in which the per sample error period local copy $T'_{es}$ is decremented by 1 and a determination is then made at step 246 as to whether the decremented value of $T'_{es}$ is zero. If No, the process advances to step 251 at which j is incremented by one. If Yes, the method passes to step 248, at which j is decremented by 1 and the local copy, $T'_{es}$ is reset to the original per sample error period $T_{es}$. The process then passes to step 251 in which j is incremented by one.

Where the actual clock frequency is higher than the nominal value, the sequence will be generated more rapidly than desired and it would therefore take less time than the desired sequence period to generate the full sequence. The method of the present embodiment automatically adjusts for the higher clock frequency to effectively "stretch" the sequence into the desired period. In the present embodiment, this is achieved by repeating the generation of a sequence segment at the end of each per sample period $T_{es}$ over the sequence period, and which is implemented by effectively cancelling the integer increment of j in the combination of steps 248 and 251.

After step 251, the method progresses to step 253 at which it is determined whether the end of the sequence has been reached by determining whether j is equal to or greater than $j_{max}$. If No, the method advances to step 255 and at the next clock cycle passes to step 257 at which it is determined as to whether a valid, locally generated 1PPS edge (indicating the start of a new sequence period) has been detected. If not, the process returns to step 239 at which the next logic level or value of the sequence at the value of j determined at step 251 is read and subsequently output at step 241.

If at step 253 it is determined that j has reached or exceeded $j_{max}$, j is reset to zero (or in other embodiments, another number) at step 254. The next clock cycle occurs at step 255 and the process passes to step 257. If the end of the sequence has been reached (as determined in step 253), it may be expected to detect a valid 1PPS edge at step 257. If a valid edge is not detected, the locally generated 1PPS signal may have been lost, in which case, at the end of the previous sequence, the next sequence is automatically generated beginning with step 239 at which the first logic level or value of the next sequence (i.e. at j=0) is read, and its associated logic level or value is output at step 241. In this case, the best estimator of the mean and the per sample error period $T_{es}$ are not updated and the algorithm uses the same values of these variables used in generating the previous sequence. Thus, successive sequences will be generated using the same values of the best estimator of the mean and the per sample error period until a valid 1PPS edge reappears.

If at step 257, a valid 1PPS edge is detected, the process advances to step 259 at which j is reset to zero (or some other number). Thus, irrespective of whether the full sequence has been generated as determined at step 253, detection of a valid 1PPS edge will terminate the generation of that particular sequence. The method passes from step 259 to 261 at which the value of the best estimator of the mean, $\bar{x}_i$ and the per sample error period $T_{es}$ are read, and a local copy of the new sample error period $T'_{es}$ is made. Thus, in the present embodiment, $\bar{x}_i$ and $T_{es}$ are only updated if a valid 1PPS edge is detected. (However, in other embodiments, the value of $T_{es}$ and $\bar{x}_i$ may be changed in the event that a valid 1PPS edge is not detected, e.g. if the reference signal disappears, to account for the dependence of these parameters on other factors, such as temperature, as indicated above.) As the only variable on which $T_{es}$ depends is $\bar{x}_i$, ($x_{CLK}$ being a constant) the value of these parameters will generally only change if the best estimator of the mean changes. The best estimator of the mean may be determined by taking into account the total number of clock cycles counted in the previous 1PPS period between successive 1PPS edges.

A numerical example will now be described with reference to the method of FIG. 6 in which the nominal clock rate, $x_{CLK}$ is 100 and the best estimator of the mean, $\bar{x}_i$ is 96. In this case, $T_{es}$=−24. After initializing and reading variables at steps 231 and 233 and detection of a valid edge at step 235, the first logic level or value of the sequence is read at step 239 and output at step 241. At step 243 a determination is made that $T_{es}$ is negative (and therefore the actual clock rate is slower than the nominal clock rate) and the process proceeds to the left-hand branch of the algorithm. At step 245, the value of the local copy, $T'_{es}$ is incremented by 1 ($T'_{es}$=−23), the process advances from step 247 to step 251, where j is incremented by 1 and the process advances through steps 253, 255, 257 and back to step 239 where the logic level or value associated with the second segment of the sequence (j=1) is read, and the value is output at step 241. The method continues to cycle and output values of successive segments of the sequence until the $24^{th}$ segment is output at j=23 and $T'_{es}$=−1 at steps 241 and 243. At this point, the process passes from step 247 ($T'_{es}$=0) to step 249 in which j is incremented by 1, and then to step 251 at which j is again incremented by 1, in which case j=25. Thus, when the process returns to step 239, the logic level or value of the $26^{th}$ segment (j=25) is read instead of the $25^{th}$ segment (at j=24). Also at step 249, the local copy $T'_{es}$ is reset to the original value, $T_{es}$=−24 in the present example.

The process continues to generate segments of the sequence until $T'_{es}$ again becomes zero at step 247 for a value of j=48 whereupon j is incremented by two and the $51^{st}$ segment at j=50 is output rather than the $50^{th}$ segment at j=49. Again, at step 249, the local copy of $T'_{es}$ is reset to the original value $T_{es}=-24$. The process again continues until $T'_{es}$ at step 247 reaches zero, and in the next cycle the $75^{th}$ segment at j=74 is skipped and the $76^{th}$ segment output instead. The local copy $T'_{es}$ is again reset to $T_{es}=-24$ and the next 24 segments are output including the $99^{th}$ segment (j=98). At this point, step 247 determines that the value of $T'_{es}$ is zero and the value of j is incremented twice so that j=100 and exceeds $j_{max}$(=99). In this case, generation of the sequence ends with j being reset to zero, so that in the next cycle, rather than outputting the last (i.e. $100^{th}$ sequence segment), the first segment of the next sequence is generated.

As can be seen from the above example, in generating a sequence when the clock rate is slower than the nominal clock rate, certain segments of the sequence are skipped and not output. The number of segments which are not output correspond to the difference between the nominal clock rate and the clock rate provided by the best estimator of the mean, in this case four. Thus, in generating the sequence, the number of sequence segments actually output will be reduced from the total number of available to a number substantially corresponding to the determined number of clock cycles in the reference signal, for example, provided by $\bar{x}_i$. The segments which are not generated are also distributed evenly through the sequence, in this case every $25^{th}$ segment is skipped (i.e. segments 25, 50, 75 and 100).

Although in the example described above, T, has an integer value, the process also works for non-integer values.

As can be appreciated, when the clock rate is faster than the nominal clock rate, the algorithm inserts into the generated sequence a repeated segment of a previous segment, also at regular intervals within the complete sample or sequence period.

Modifications may be made to the process to remove or repeat other sequence segments when generating a sequence, as will be apparent to those skilled in the art. For example, the process may be implemented to remove or repeat segments at non-regular intervals, to remove or repeat a plurality of sequential segments, and/or to remove or repeat segments selected at random.

In another embodiment, a sequence may be designed to accommodate a variability of the actual clock rate from the nominal clock rate by determining the same sequence for different values of $\bar{x}_i$. In this case, one of a plurality of the same sequences for different $j_{max}$ may be selected depending on the value of the best estimator of the mean.

Figure 7:
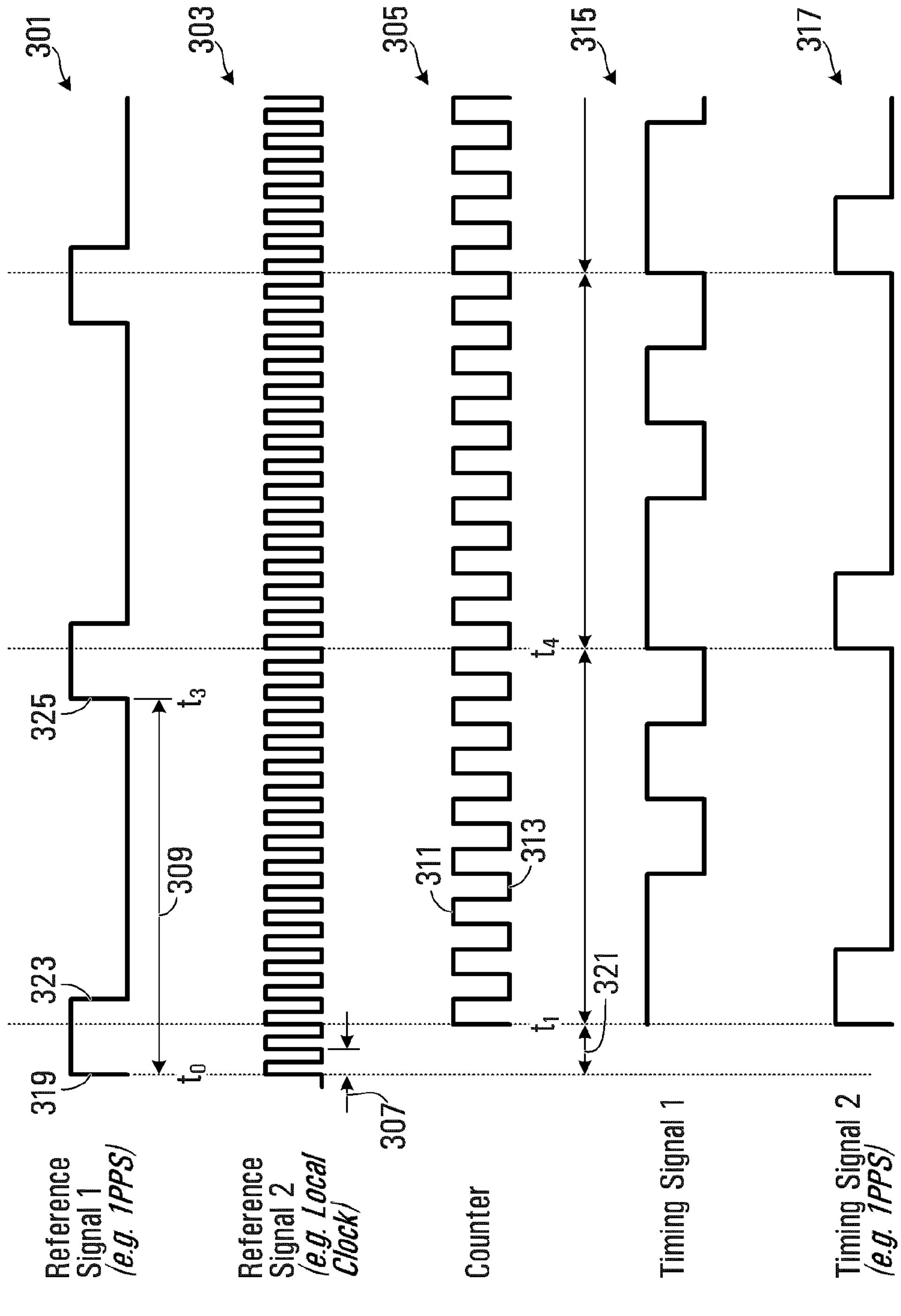
FIG. 7 shows a timing diagram of various time signals to illustrate operation of an embodiment of the invention.

FIG. 7 is a timing diagram showing examples of traces of various time signals for illustrating operation of an embodiment of the present invention. Referring to FIG. 7, the upper trace 301 represents a first reference signal, for example, a 1PPS signal generated by a local GPS receiver. The second trace 303 represents a second reference signal, for example, a local clock oscillator signal. The third trace 305 represents transitions of a counter which counts the number of time intervals (e.g. clock cycles 307) of the second reference signal in a time interval (e.g. 1PPS time signal 309) of the first reference signal 301. In this representation, each integer increment of the counter is represented by a high or low state 311, 313. Trace 315 represents a first timing signal generated according to a first sequence and trace 317 represents a second timing signal, for example, a replicate of the first reference signal 301 (e.g. 1PPS signal).

In operation, a transition or edge 319 in the first reference signal occurs at time $t_0$ and is detected by the logic device. The edge 319 may be detected, for example, by a logical transition in the state of a register. Detection of the edge 319 triggers the start of a counter which counts the number of time intervals 307 of the second reference signal in a time interval 309 of the first reference signal. There may be small delay, for example, from 2 to 5 clock cycles between actual occurrence of the edge 319 at time $t_0$ and the start of the counter at time $t_1$. The higher state of the first reference signal lasts for a predetermined period of time, e.g. typically about 200 milliseconds for a GPS receiver 1PPS signal before returning to its lower value. The transition 323 from the upper to the lower state of the first reference signal is detected by the logic device to control stopping and resetting the counter at the next low to high transition of the first reference signal. The next low to high transition 325 occurs at time $t_3$ and may be detected after a small delay at time $t_4$ which corresponds to the delay 321 of detecting the first transition 319. At time $t_4$, the counter is stopped, reset and restarted and the number of counts (i.e. clock cycles) in the 1PPS time interval 309 is recorded. This new value of the number of clock cycles in the 1PPS time interval may be used together with one or more previously measured values to determine an average value.

On detection of the edge 319 at time $t_1$, generation of the timing signal 315 is started, for example, in accordance with the method described above in conjunction with FIG. 4 or 6. At the same time, generation of the optional timing signal 317 and any other timing signal(s) may also be started. The second timing signal 317 and any other timing signal(s) may also be generated using a method similar to that described above with reference to FIG. 4 or 6.

On detection of the next valid edge 325 of the first reference signal, generation of the timing signal sequence of each timing signal 315, 317 stops and the beginning of the next sequence restarts at time $t_4$.

In the event that the first reference signal 301 is lost, the expected next edge of the signal will not be detected, in which case the counter may continue to run and not be reset at the end of the next interval. In this case, the value of $x_i$ will exceed the previously defined average value or best estimator and may be discarded and not used in determining future values of $\tilde{x}_i$ or $\bar{x}_i$. In this case, the value of $\bar{x}_i$ used to continue to generate the timing signal(s) may be the last valid value, for example. This value may be used to generate each timing signal until the first reference signal reappears and a succession of two or more valid edges are detected.

Although in the example of FIG. 7, the length of each sequence of the timing signals 315, 317 corresponds to a time interval of the reference signal, the length of a sequence of a timing signal is entirely arbitrary and can be selected as desired. For example, the length of a sequence may be a fraction of the length of a time interval of the reference signal, so that, for example, there are multiple sequences of a timing signal in one time interval of the reference signal, or, in other words, $j_{max}$ may be much smaller than $x_{CLK}$, i.e. $j_{max} \ll x_{CLK}$ for example.

In the method of FIG. 4, when the 1PPS signal is lost, the generation of the sequence continues and the time at which each successive sequence starts and ends is determined by the clock frequency and the value of $j_{max}$. When $j_{max}$ is reached, the value of j is reset to zero and generation of a new sequence is started. This method works adequately where the local oscillator clock maintains accurate timing so that there is little deviation of $\bar{x}_i$ from the nominal clock rate. Any continuous positive or negative deviation from the nominal clock frequency will result in an accumulative error over time, and this may be acceptable in some applications.

On the other hand, in the embodiment of FIG. 6, each sequence is generated within a predetermined time interval which is based on the best estimator of the mean at the time the reference signal is lost. The sequence is accommodated within the allocated time period irrespective of the number of time segments within the sequence as indicated by $j_{max}$. Accordingly, in the method of FIG. 6, there need be no assumption that the actual local clock frequency is the same as the nominal clock frequency. Thus, this embodiment enables the source of accumulative errors noted above in relation to FIG. 4 to be removed.

In other embodiments of the apparatus and method, any reference signal may be used to generate the timing signal. The reference signal may be a 1PPS signal based on the universal time period derived from any suitable source, such as a GPS network or other network, or it may be a signal derived for another clock source, which may or may not be part of or associated with the apparatus or co-located with it. For example, the apparatus may be used to provide redundancy for a first clock source in system, and used to generate a timing signal using a second clock source and a determined relationship between the timing signals of the first and second clock sources, if the first clock source fails, or its signal becomes unavailable.

As indicated above, in other embodiments of the present invention, the period of the first reference signal may be shorter than the period of the second reference signal. The relationship between the first and second signals which is used to generate the timing signal may be the number of time intervals of the first signal in a time interval of the second signal. The relationship may be determined by measuring the frequency of the two signals and determining the relationship between the two frequencies. If the first reference signal is lost, the timing signal can be generated using the second signal and the determined relationship between the time intervals in the first and second reference signals, respectively.

In some embodiments, where the period of the first signal is shorter than the period of the second signal, the signals may be sampled by a third signal having a suitable sampling frequency, thereby enabling the periods of the first and second signals to be measured and the relationship between their periods to be determined.

In other embodiments, where the period of the first signal is shorter than the period of the second signal, the first signal may be used to sample the second period, if the first signal has a sufficiently high frequency (e.g. 2 or more times the frequency of the second signal), and the measured frequency used to determine a relationship between the periods of the two signals. If the first signal disappears, the timing signal can be generated using the determined relationship and the second signal. This may be implemented, for example, where the period of the timing signal is longer than both the first and second signals. For example, the first signal may have a frequency of 2 MHz, the second signal a frequency of 1 MHz and the timing signal may have a frequency of 1 Hz.

Other aspects and embodiments of the invention may comprise any one or more feature(s) disclosed herein in combination with any one or more other features disclosed herein.

In any aspect or embodiment of the invention disclosed or claimed herein, any one or more features of that aspect or embodiment may be omitted altogether, or replaced by another feature which may or may not be an equivalent or variant thereof.

Numerous modifications to the embodiments described herein will be apparent to those skilled in the art.

The invention claimed is:

1. An apparatus for generating a timing signal, comprising:

an input for receiving a first signal indicating successive time intervals;

means for receiving a second signal indicating successive time intervals;

a generator adapted to generate a timing signal based on the second signal and on a relationship between one or more time intervals of said first signal and one or more time intervals of said second signal; and determining means for determining said relationship from said first and second signals;

wherein said relationship is one or both of (1) a number of successive time intervals of the second signal in one or more time intervals of the first signal and (2) a number of successive time intervals of the first signal in one or more successive time intervals of the second signal; and, wherein said determining means is adapted to determine an average number of time intervals of said second signal in a time interval of said first signal, and to determine a first average from a first plurality of samples, each sample comprising the number of time intervals of said second signal in a time interval of said first signal, to determine a first difference between said first average and one of said samples, to determine a second average from a second plurality of samples, at least one sample of said second plurality of samples not included in said first plurality of samples, to determine a second difference between said second average and a sample of said second plurality of samples, and to determine a deviation based on said first and second differences.

2. An apparatus as claimed in claim 1, wherein said generator is adapted to generate said timing signal based on one of:

the time intervals in said second signal, and said average number.

3. An apparatus as claimed in claim 1, wherein said determining means is adapted to determine a value indicative of a deviation or difference of said number from said average number.

4. An apparatus as claimed in claim 3, further comprising control means for determining whether or not the value indicative of said deviation or difference meets a predetermined criteria and which is operative to control said generator based on said determination.

5. An apparatus as claimed in claim 4, wherein said controller is adapted only to pass a value of the number of time intervals of said second signal in a time interval of said first signal associated with a determined deviation to said generator if the value indicative of said deviation or difference meets said predetermined criteria.

6. An apparatus as claimed in claim 1, wherein said determining means is adapted to repeatedly determine the average number of time intervals of said second signal in a time interval of said first signal and a value indicative of the deviation or difference from the mean for each average and, wherein a controller is adapted to select which of said determined average numbers to provide to said generator to generate said timing signal based on the value of each determined value indicative of said deviation or difference.

7. An apparatus as claimed in claim 1, further comprising a controller for controlling one or more of (1) which time intervals of said first signal are used in said determination and (2) the number of time intervals of said first signal used in said determination.

8. An apparatus as claimed in claim 7, wherein said controller is adapted to provide said generator with one or more currently determined values of the number if one or more predetermined criteria is met.

9. An apparatus as claimed in claim 8, wherein said predetermined criteria includes the quality of said first signal falling below a predetermined value.

10. An apparatus as claimed in claim 9, wherein said number depends on the temperature of a source providing said second signal and said controller is adapted to provide said generator with a number appropriate to the temperature of said source.

11. An apparatus as claimed in claim 1, further comprising aligning means for aligning a start of a time interval in said timing signal with a start of a time interval in said first signal.

12. An apparatus as claimed in claim 11, wherein said aligning means comprises means for advancing the start of said timing signal to compensate for delay between detection of the start of a time interval of said first signal and generating a start of said timing signal.

13. An apparatus as claimed in claims 1, wherein said generator comprises a sequence generator for generating said timing signal based on a predefined sequence of values.

14. An apparatus as claimed in claim 13, wherein said sequence generating controller is adapted to distribute exclusions of segments of said predefined sequence or insertions of additional segments substantially uniformly in the generated sequence.

15. An apparatus as claimed in claim 13, wherein said sequence generating is adapted to control a number of segments at least partially derived from said predefined sequence in said generated sequence so that said generated sequence spans a time period corresponding to one or more time intervals defined by said first signal.

16. An apparatus as claimed in claim 1, further comprising a sequence generator operatively coupled to said generator for generating a time varying signal based on a predefined sequence of values, wherein the sequence has a timing relationship with the timing signal generated by said generator.

17. An apparatus for generating a timing signal, comprising:

an input for receiving a first signal indicating successive time intervals;

means for receiving a second signal indicating successive time intervals;

a generator adapted to generate a timing signal based on the second signal and on a relationship between one or more time intervals of said first signal and one or more time intervals of said second signal; and detection means for detecting a start or end of a time interval in said first signal, and control means adapted to provide an indication of a detected start or end of said time interval to said generator and said generator is responsive to said indication only if the number of measured time intervals of said second signal prior to said detection meets a predetermined criteria; and determining means for determining an average number of time intervals of said second signal in a time interval of said first signal, and determining a first average from a first plurality of samples, each sample comprising a number of time intervals of said second signal in a time interval of said first signal, to determine a first difference between said first average and one of said samples, and determining a second average from a second plurality of samples, at least one sample of said second plurality of samples not included in said first plurality of samples, to determine a second difference between said second average and a sample of said second plurality of samples, and to determine a deviation based on said first and second differences.

18. An apparatus as claimed in claim 17, wherein said predetermined criteria is that a difference between a predetermined value of the number of time intervals of said second signal in a time interval of said first signal and said measured value is less than or equal to a predetermined value.

19. An apparatus as claimed in claim 17, wherein said generator is responsive to a determination of said start or end of a time interval in said first signal to generate a start of said timing signal.

20. An apparatus as claimed in claim 19, wherein said generator generates, in the absence of a determination of an expected start or end of a time interval of said first signal, the start of the next timing signal based on said relationship and said second signal.

21. A method of generating a timing signal comprising the steps of:

receiving a first signal indicating successive time intervals;

receiving a second signal indicating successive time intervals;

generating a timing signal based on the second signal and on a relationship between one or more time intervals of the first signal and one or more time intervals of the second signal;

wherein said relationship is one or both of (1) a number of successive time intervals of the second signal in one or more time intervals of the first signal and (2) a number of successive time intervals of the first signal in one or more successive time intervals of the second signal; and determining an average number of time intervals of said second signal in each of a plurality of time intervals of said first signal, and determining a first average from a first plurality of samples, each sample comprising a number of time intervals of said second signal in a time interval of said first signal, to determine a first difference between said first average and one of said samples, and determining a second average from a second plurality of samples, at least one sample of said second plurality of samples not included in said first plurality of samples, to determine a second difference between said second average and a sample of said second plurality of samples, and to determine a deviation based on said first and second differences.

22. A method as claimed in claim 21, comprising generating the timing signal using one or more currently determined values of the number if one or more predetermined criteria is met.

23. A method as claimed in claim 21, further comprising determining the temperature of the source and using a number to generate the timing signal based on the temperature.

24. A method as claimed in claim 21, further comprising wirelessly receiving a referenced time signal and generating said first signal from said referenced time signal.

25. A method as claimed in claim 21, further comprising generating said second signal by a local oscillator or local clock source.

26. A method as claimed in claim 21, further comprising generating a time varying signal according to a sequence wherein the sequence has a timing relationship with the timing signal.

* * * * *